US008068502B2

(12) United States Patent
Mukherjee et al.

(10) Patent No.: US 8,068,502 B2
(45) Date of Patent: Nov. 29, 2011

(54) METHOD AND APPARATUS FOR ENABLING PERSISTENT CONNECTIONS WITH WIRELESS NETWORKS

(75) Inventors: Sarit Mukherjee, Morganville, NJ (US); Sanjoy Paul, Marlboro, NJ (US); Krishan K. Sabnani, Westfield, NJ (US)

(73) Assignee: Alcatel Lucent, Paris (FR)

( * ) Notice: Subject to any disclaimer, the term of this patent is extended or adjusted under 35 U.S.C. 154(b) by 1366 days.

(21) Appl. No.: 11/027,908

(22) Filed: Dec. 30, 2004

(65) Prior Publication Data

US 2006/0148460 A1  Jul. 6, 2006

(51) Int. Cl.
*H04L 12/28* (2006.01)
(52) U.S. Cl. .................................................... 370/400
(58) Field of Classification Search .................. None
See application file for complete search history.

(56) References Cited

U.S. PATENT DOCUMENTS

| | | | | |
|---|---|---|---|---|
| 5,951,694 | A * | 9/1999 | Choquier et al. | 714/15 |
| 6,865,185 | B1 * | 3/2005 | Patel et al. | 370/412 |
| 6,904,025 | B1 * | 6/2005 | Madour et al. | 370/328 |
| 7,149,537 | B1 * | 12/2006 | Kupsh et al. | 455/466 |
| 7,197,660 | B1 * | 3/2007 | Liu et al. | 714/4 |
| 7,237,257 | B1 * | 6/2007 | Hirsh | 726/10 |
| 2004/0039807 | A1 * | 2/2004 | Boveda De Miguel et al. | 709/223 |
| 2004/0192309 | A1 | 9/2004 | Watanabe et al. | |

FOREIGN PATENT DOCUMENTS

| | | |
|---|---|---|
| EP | 1 303 102 A | 4/2003 |
| EP | 05 25 7717 | 3/2006 |
| WO | WO 02/35790 A1 | 5/2002 |

OTHER PUBLICATIONS

Zhimei Jiang et al: "Seamless mobility management based on proxy servers" Wireless Communications and Networking Conference, 2002. WCNC2002. 2002 IEEE, Piscataway, NJ, USA, IEEE, vol. 2, Mar. 17, 2002, pp. 563-568, XP010585656 ISBN: 0-7803-7376-6.
Tanapoom Damraks, et al., "Mobility Support for IEEE 802.11 Power Saving Terminal Across Access Points Running TCP Proxy," Information Processing Society of Japan, Mar. 5, 2004, vol. 2004, No. 21, pp. 15-22.
Examiner's Office Letter in Japanese Patent Application No. 2005-371996, Alcatel-Lucent USA Inc., Applicant, mailed Apr. 4, 2011, 4 pages.

* cited by examiner

*Primary Examiner* — Robert Wilson
(74) *Attorney, Agent, or Firm* — Wall & Tong, LLP (57) ABSTRACT

The invention comprises a method and apparatus for establishing a persistent connection between a user device and a service gateway. Specifically, the method comprises obtaining state information in response to a connection request, establishing a connection between the user device and the service gateway using the state information, and maintaining the state information associated with the connection such that the connection is persistent through at least one network state change.

20 Claims, 5 Drawing Sheets

METHOD AND APPARATUS FOR ENABLING PERSISTENT CONNECTIONS WITH WIRELESS NETWORKS

FIELD OF THE INVENTION

The invention relates to the field of communication networks and, more specifically, to establishing connections for accessing services via wireless networks.

BACKGROUND OF THE INVENTION

In general, existing wireless networks require a significant amount of time to provide various services to wireless users. For example, after a user powers up a mobile device (e.g., a cellular phone, a personal digital assistant (PDA), and the like), the mobile device typically attempts to connect to a wireless network by acquiring a channel in the wireless network. The mobile device is authenticated and registers with the wireless network. Following registration of the mobile device, the user is authenticated, an IP address is allocated to the device, and a link-level connection (e.g., a Point-to-Point Protocol (PPP) connection) is established between the mobile device and the wireless network. Once the user is connected to the wireless network, the user may access various applications (e.g., Microsoft Internet Explorer™, Microsoft Outlook™, and the like) and associated services.

In general, there is considerable delay associated with the signaling, registration, authentication, and associated processing required for accessing services via wireless networks. This relatively slow service access process is exacerbated by inherently error-prone wireless links (e.g., due to multi-path and fading conditions), inadequate wireless coverage by wireless service providers, difficulty of locating inactive user devices, and like conditions. Furthermore, services are often available only from the service provider network with which the user subscribes, preventing users from accessing services across administrative boundaries (i.e., between service providers). Similarly, existing service solutions prevent access to such services across access network technologies (e.g., CMDA, WIFI networks, and the like).

Accordingly, a need exists in the art for a method and apparatus for enabling a user device to establish and maintain a persistent connection with a network, thereby enabling a user to access network services irrespective of administrative boundaries and access network technologies.

SUMMARY OF THE INVENTION

Various deficiencies in the art are addressed by the present invention of a method and apparatus for establishing a persistent connection between a user device and a service gateway. Specifically, the method comprises obtaining state information in response to a connection request, establishing a connection between the user device and the service gateway using the state information, and maintaining the state information associated with the connection such that the connection is persistent through at least one network state change.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention is discussed in the context of a communication services overlay network and a plurality of access networks; however, the methodology of the invention can readily be applied to other networks and network topologies. In general, the present invention enables user devices to establish and maintain persistent connections with a network by obtaining state information and maintaining the state information within the network. As such, the present invention obviates the need for various session establishment and authentication actions to be performed each time a user initiates a connection/service request, significantly reducing connection/service request response times experienced by the customers. By enabling users to maintain persistent connections with the network, the present invention thereby enables a service provider to provide various network services to the users.

Figure 1:
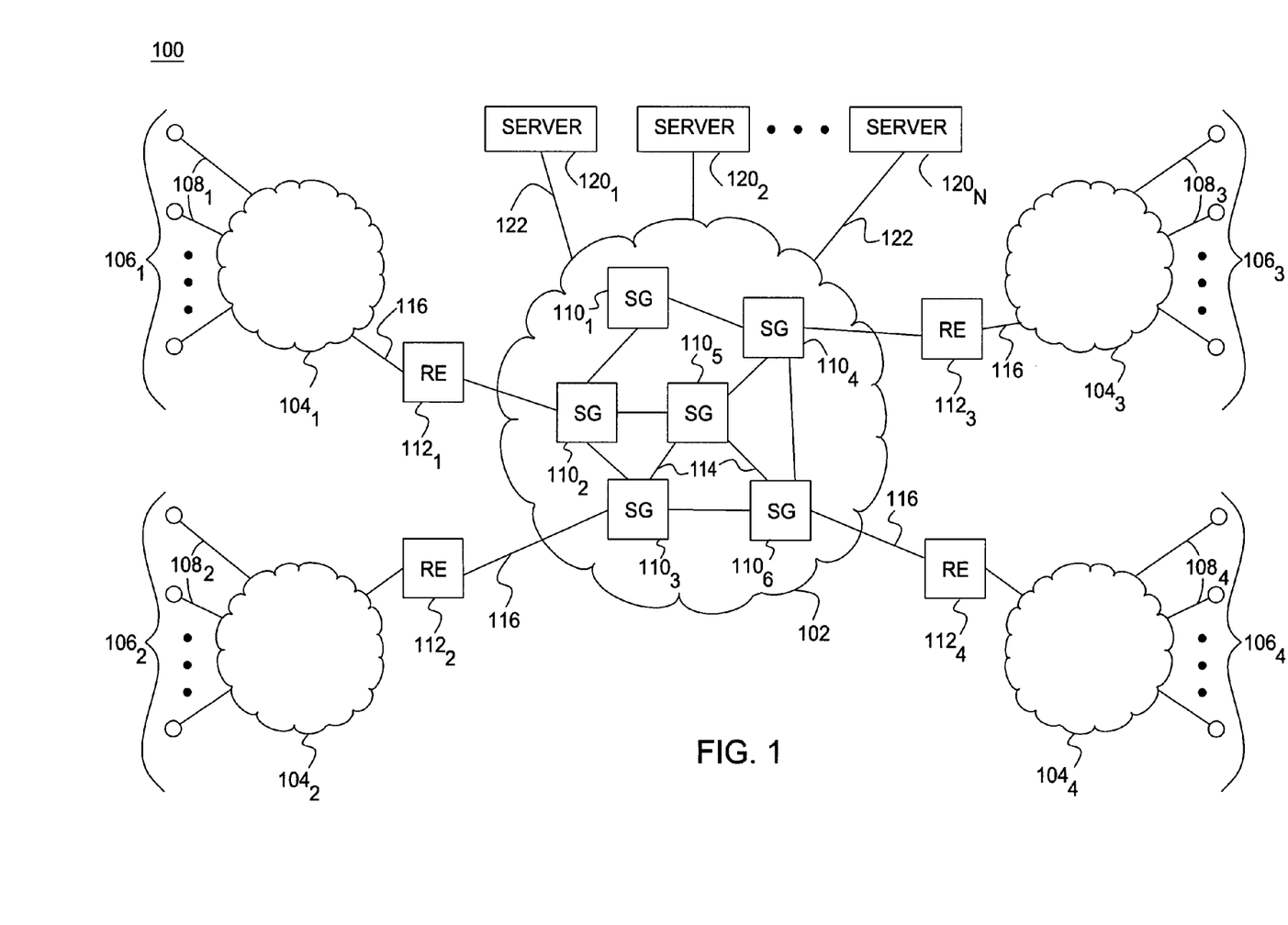
FIG. 1 depicts a high level block diagram of a communications network.

FIG. 1 depicts a high-level block diagram of a communications network. Specifically, communications network 100 of FIG. 1 comprises an overlay network (ON) 102, a plurality of redirector elements (REs) $112_1$-$112_4$, a plurality of access networks (ANs) $104_1$-$104_4$ (collectively, ANs 104), a plurality of user devices (UDs) $106_1$-$106_4$ (collectively, UDs 106), and a plurality of servers $120_1$-$120_N$ (collectively, servers 120). The ON 102 comprises a plurality of service gateways (SGs) $110_1$-$110_6$ (collectively, SGs 110).

As depicted in FIG. 1, the servers 120 communicate with ON 102 via a respective plurality of communication links (CLs) 122 (collectively, CLs 122). Although not depicted, each of the servers 120 is accessible from at least a portion of the SGs 110. In general, the servers 120 comprise computer systems capable of providing services in response to service requests. As such, in one embodiment, the servers 120 comprise media servers, web servers, and like servers as known in the art. For example, the servers 120 may comprise AOL instant messaging servers, Google servers, Amazon servers, and the like.

In general, service requests comprise requests to view inventory, requests to initiate purchases online, requests to search the Internet, and the like. In one embodiment, a service request comprises a request for at least one "always-on" service. In one embodiment, the servers 120 respond to service requests initiated by the UDs 106. In another embodiment, the servers 120 respond to service requests initiated by the SGs 110. In another embodiment, the servers 120 respond to locally triggered service requests (e.g., periodically pushing weather updates to UDs subscribing to a weather update service, pushing traffic information to UDs according to UD location information, and the like).

As depicted in FIG. 1, UDs $106_1$-$106_4$ access ANs $104_1$$104_4$, respectively, via respective pluralities of access communication links (ACLs) $108_1$-$108_4$ (collectively, ACLs 108). The ANs 104 access ON 102 via respective REs 112 and an associated plurality of communication links (CLs) 116 (collectively, CLs 116). The SGs 110 and REs 112 communicate via a respective plurality of overlay network communication links (ONCLs) 114 (collectively, ONCLs 114). The ANs 104 comprise access networks suitable for enabling communication between the UDs 106, and for enabling the UDs 106 to access applications and services via ON 102.

In one embodiment, at least one of the ANs 104 comprises a wireless access network, such as a 3G wireless network, a 4G wireless network, a WIFI hotspot wireless network, a CDMA2000 wireless network, and like wireless networks enabling wireless UDs to access applications and services via the REs 112 and SGs 110. In this embodiment, UDs 106 associated with a wireless AN comprise wireless UDs, such as mobile phones, personal digital assistants (PDAs), computers, and like wireless UDs. In this embodiment, the ACLs 108 comprise wireless ACLs.

In another embodiment, at least one of the ANs 104 comprises a wireline access network, such as an Internet Protocol (IP) network, a Publicly Switched Telephone Network (PSTN), and like wireline networks enabling wireline UDs to access application and services via REs 112 and SGs 110. In this embodiment, the UDs 106 associated with a wireline AN comprise wireline UDs, such as Time Division Multiplexing (TDM) phones, IP phones, Session Initiation Protocol (SIP) phones, Integrated Digital Services Network (ISDN) phones, computers, and like wireline UDs. In this embodiment, the ACLs 108 comprise wireline ACLs.

The REs 112 comprise network elements operable for receiving signaling and media traffic from ANs (illustratively, the ANs 104), and for directing the traffic to at least one of the SGs 110. Similarly, the REs 112 comprise network elements operable for receiving signaling and media traffic from the SGs 110, and for directing the traffic to at least one associated AN. In one embodiment, the REs 112 transport traffic between the ANs 104 and ON 102 in a manner transparent to the source of the traffic (i.e., transparent to the UDs 106). In one embodiment, a RE is hosted within an associated AN served by that RE. In another embodiment, a RE is hosted within an ON (illustratively, ON 102).

In one embodiment, the REs 112 support signaling and bearer sessions with the at least a portion of the SGs 110 such that the SGs 110 maintain full control of the persistent connections established with the UDs 106. In one such embodiment, the SGs 110 perform IP address assignment to the UDs 106. Since the REs 112 are operable for communicating with various ANs, interface characteristics associated with interfaces between REs and ANs are dependent on the type of AN supported by that RE (e.g., a 3G AN, a 4G AN, a PSTN AN, a CDMA2000 AN, and the like).

For example, in support of a CDMA2000 AN, the associated RE operates as a Packet Data Service Node (PDSN) to the Packet Control Function (PCF) of the CDMA2000 access network, and operates as a PCF to at least one associated SG. In one embodiment, the RE provides security functions for preventing unregistered UDs from accessing network services. For example, the security functions are implemented by configuring the RE to proxy as a PDSN, to terminate A11 signaling and like signaling from the PCF, to terminate a Link Control Protocol (LCP) phase of PPP negotiation between the RE and a mobile UD, and the like. In one embodiment, the RE initiates user authentication with a mobile UD, utilizing an associated user identifier to determine whether a particular service is available to the user of the mobile UD.

In continuation of this example, upon determining that a mobile UD subscribes to a requested service, the RE selects an optimum SG best-suited for responding to associated service requests. In one embodiment, the RE selects the optimum SG according to at least one parameter (e.g., current SG load statistics, associated service request types, and the like). If the RE determines that a mobile UD does not subscribe to the requested service, the RE establishes a session with the PSDN in the CDMA2000 network. In each case, the SG completes the data connection with the mobile UD, and the RE continues to facilitate communication between the elements.

In another example, in support of a WIFI hotspot AN, a RE implements a PPTP (Point-to-Point Tunneling Protocol) proxy. The mobile UDs are configured with respective IP addresses assigned by an associated access point (not depicted). The mobile UDs that subscribe to particular services initiate respective PPTP sessions with the RE, thereby forcing the mobile UDs to tunnel PPP frames to the RE using the IP address provided by the access point.

Using the methodologies of the present invention, the RE tunnels the PPP frames to the optimum SG responsible for terminating the session and assigning respective IP addresses. As such, each mobile UD is assigned two IP addresses. The IP address assigned by the access point is used for tunneling PPP frames. The IP address assigned by the optimum SG is used for maintaining a persistent connection in support of data communications. In one embodiment, the RE may implement an L2TP (Layer-2 Tunneling Protocol) proxy rather than a PPTP proxy.

As depicted in FIG. 1, the SGs 110 comprise network elements operable for establishing persistent connections with UDs, and for maintaining the persistent connections through at least one network state change, according to the methodologies of the present invention. In one embodiment, the SGs 110 maintain multi-layer states (including multi-layer state information) for at least a portion of the UDs serviced by the SGs 110. In one embodiment, the SGs 110 maintain data-link layer state information, network layer state information, transport layer state information, and application layer state information, either singly or in combination, for each UD with which a connection is established.

Furthermore, the SGs 110 comprise network elements operable for responding to service request (including requests for "always-on" services) according to the methodologies of the present invention. As depicted in FIG. 1, the SGs 110 operate as gateways to the various services available from the servers 120. In one embodiment, at least a portion of the SGs 110 comprise services functionality. For example, at least a portion of the SGs 110 comprise "always-on" services functionality, obviating the need to modify existing service provider network elements and service elements in support of "always-on" services.

By maintaining persistent connections with UDs, the SGs 110 are able to provide a plurality of functions to the UDs. In one embodiment, a SG provides enhanced quality of service (e.g., user experience) to mobile UDs by proxying on behalf of the mobile UDs. By proxying on behalf of a mobile UD, a SG is able to perform at least a portion of the mobile UD functions in the wired network. As such, this embodiment significantly reduces time-intensive wireless transactions between the mobile UD and the AN required for session establishment, Domain Name Server (DNS) queries, and like functions.

In another embodiment, a SG supports multimodal operations by managing multiple overlapping ANs. For example, in a particular geographic region, a mobile UD may have access to a plurality of ANs, such as a wide-area 3G wireless AN and a WIFI hotspot AN. In such a geographic region, each available AN is accessible by a mobile UD equipped with a corresponding interface for accessing that AN. For example, a mobile UD may comprise a built-in WIFI interface for accessing the WIFI hotspot AN, as well as a 3G PCMCIA card for accessing the wide-area 3G wireless AN.

In this embodiment, the optimum SG selects the network interface used by a mobile UD, and signals the mobile UD to use the selected network interface. As such, the optimum SG seamlessly switches the persistent connection between the WIFI hotspot AN and 3G wireless AN. As such, although the WIFI hotspot AN is designed to provide a higher data rate, the optimum SG may select the 3G wireless AN based on knowledge of the traffic load, service response delay times associated with each of the available ANs, and like information. In one embodiment, seamless switching of persistent connections is performed across administrative boundaries (e.g., switching the persistent connection from a Cingular Wireless AN to a Verizon Wireless AN).

This embodiment obviates the need for the mobile UD to select the AN to use for communications. As such, the SG provides enhanced quality of user experience since selection of an AN by the mobile UD currently results in selection of the available AN designed to provide the higher data rate, rather than selection of the available AN capable of providing the higher data rate at the time of communication between the mobile UD and the AN. In other words, selection of the AN by the mobile UD is performed irrespective of network conditions such as strength of signal, traffic volume, network congestion, and like factors. Furthermore, this embodiment enables removal of AN selection intelligence from the mobile UDs, thereby reducing the cost of designing and producing the mobile UDs.

In one embodiment, a SG monitors roaming of a mobile UD within an AN and across ANs, and dynamically prepares context information associated with the mobile UD. In one embodiment, the context information comprises at least one context parameter. In one embodiment, the at least one context parameter comprises at least one of: a network identification parameter, an available bandwidth parameter, at least one intermediary IP address, and like context parameters. For example, the at least one intermediary IP address comprises an IP address associated with at least one of: a local web object cache, a local SIP proxy, a local DNS server, and the like.

In one embodiment, a SG supports mobile UD context notification. In one embodiment, a SG transmits the dynamically prepared context information comprising at least one context parameter towards a mobile UD. In one embodiment, context information is transmitted to a mobile UD at predefined intervals. In another embodiment, context information is transmitted to a mobile UD in response to movement of the mobile UD from a first AN to a second AN. In one embodiment, a mobile UD reconfigures itself using at least a portion of the received context information.

For example, a mobile UD may reconfigure its web browser to explicitly use a proxy cache in the optimum SG with which the mobile UD has established a persistent connection. This improves a user's web-browsing experience by maintaining persistent sessions with the local cache and reducing wireless DNS operations. Similarly, a SIP proxy address may be configured into the mobile UD for reducing wireless DNS operations.

In another embodiment, a SG supports server context notification. In one embodiment, at least a portion of the dynamically prepared context information is provided to at least one server (illustratively, one of the servers 120). In one such embodiment, at least a portion of the context information is used by the servers in order to provide personalized services, location sensitive services, network bandwidth sensitive services, and like services to UDs. In another embodiment, in which a SG maintains mobile UD location information, a SG pages a UD for locating a UD. In one embodiment, for example, paging is used for locating active mobile UDs and inactive mobile UDs (e.g., dormant mobile UDs).

In one embodiment, a SG maintains IP addresses of UDs, user buddy lists, and like connection and services information, thereby reducing the number of queries to DNSs and like servers for responding to service requests. In another embodiment, a SG arbitrates shared access to network resources in a manner tending to give time-sensitive "always-on" services priority over delay-tolerant applications and services requiring access to media servers, DNSs, and like servers. In another embodiment, a SG caches user profile information associated with users of the UDs in order to provide more personalized services.

In one embodiment, control and signaling information is distributed across at least a portion of the SGs in an ON. In another embodiment, bearer and transport information is distributed across at least a portion of the SGs in an ON. In another embodiment, in which both the control path and data path traverse a SG, at least one session is established between SGs for reducing latency experienced by UDs that are unable to directly connect to a SG providing a requested service. In one example, a session established between SGs for reducing latency experienced by UDs comprises establishment of a Multi-Protocol Label Switching (MPLS) tunnel between SGs.

Although a specific number of ANs 104, UDs 106, ACLs 108, SGs 110, REs 112, ONCLs 114, CLs 116, servers 120, and CLs 122 are depicted, those skilled in the art will appreciate that fewer or more ANs 104, UDs 106, ACLs 108, SGs 110, REs 112, ONCLs 114, CLs 116, servers 120, and CLs 122 may be used, and may be arranged in a variety of different network configurations. Furthermore, although one ON 102 is depicted and described with respect to FIG. 1, it should be noted that the methodologies of the present invention may be supported using additional ONs in communication with ON 102.

Figure 2:
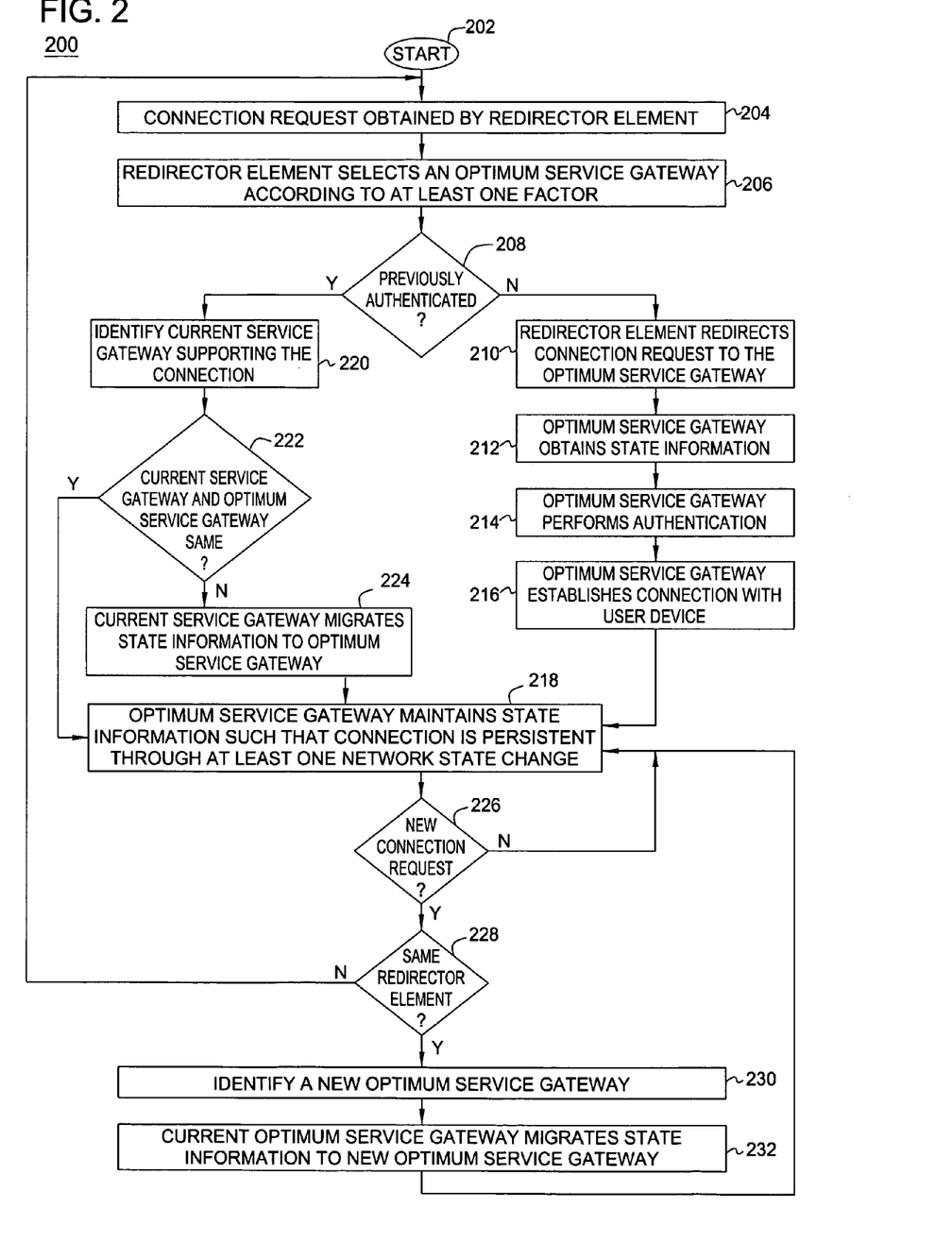
FIG. 2 depicts a flow diagram of a method according to one embodiment of the invention.

In one embodiment, depicted and described in detail with respect to FIG. 2, the invention comprises a method for establishing a persistent connection between a user device and a service gateway. In one embodiment, the method comprises obtaining state information in response to a connection request, establishing a connection between the user device and the service gateway using the state information, and maintaining the state information associated with the connection such that the connection is persistent through at least one network state change. In one embodiment, the at least one network state change comprises at least one of: at least one state change associated with the UD, at least one state change associated with the SG, and the like.

In one embodiment, the at least one state change associated with the UD comprises a change between active and inactive (e.g., dormant, unable to obtain a signal for accessing an AN, and the like), a change from being served by a first RE to being served by a second RE, a change from being served by a first AN to being served by a second AN, and like state changes. For example, as described herein, an optimum SG seamlessly maintains a persistent connection during a switch of a UD from being served by a first AN to being served by a second AN.

In one embodiment, the at least one SG state change comprises a change in the SG best-suited for maintaining the persistent connection. In one example, as a SG establishes persistent connections with other UDs, that SG becomes overloaded and offloads (i.e., migrates) at least a portion of the persistent connections to SGs better-suited for maintaining the persistent connections. Similarly, in another example, an optimum SG offloads persistent connections associated with UDs requesting a particular service in response to a loss of connectivity between that optimum SG and the server (illustratively, one of the servers 120) providing that particular service.

FIG. 2 depicts a flow diagram of a method according to one embodiment of the invention. Specifically, method 200 of FIG. 2 comprises a method for establishing a persistent connection between a user device and a service gateway. Although depicted as being performed serially, those skilled in the art will appreciate that at least a portion of the steps of method 200 may be performed contemporaneously. The method 200 is entered at step 202 and proceeds to step 204. At step 204, a connection request is obtained by a redirector element.

In one embodiment, a connection request is obtained from a UD (illustratively, one of the UDs 106). In one embodiment, a connection request is received from a UD during an initial connection establishment with the network (i.e., prior to authentication of the UD with the network). In another embodiment, a connection request is received from a UD following the initial connection establishment with the network. In another embodiment, a connection request is received from a UD in response to at least one polling message initiated by a redirector element for locating the UD.

In one embodiment, a connection request is received in response to a UD changing status from inactive to active. For example, a connection request is received as a mobile UD passes from a region without service coverage to a region with service coverage. In another embodiment, a connection request is received in response to the transfer of a UD from being served by a first RE (e.g., RE $112_1$) to being served by a second RE (e.g., RE $112_3$). In one embodiment, the transfer of a UD from being served by a first RE to being server by a second RE is triggered in response to at least one of a plurality of conditions.

In one embodiment, a UD is transferred from being served by a first RE to being served by a second RE in response to movement of the UD within an AN. In another embodiment, a UD is transferred from being served by a first RE to being served by a second RE in response to movement of the UD between ANs. In one example, a UD is transferred from being served by a first AN to being served by a second AN within the same geographic region (e.g., the AN becomes unavailable due to network failure). In another example, a UD is transferred from being served by a first AN to being served by a second AN in response to a UD moving from a geographic region being served by the first AN to a geographic region being served by the second AN.

In one such embodiment, the first AN comprises a first access technology (e.g., 3G wireless) and the second AN comprises a second access technology (e.g., 4G wireless), where the first access technology and second access technology are different. In another such embodiment, the first AN comprises a first administrative region (e.g., a Cingular Wireless AN) and the second AN comprises a second administrative region (e.g., a Verizon Wireless AN), where the first administrative region and second administrative region are different (i.e., the UD crosses an administrative boundary).

In another embodiment, the connection request is initiated by at least one of: a RE currently supporting an associated persistent connection (i.e., a current RE), an optimum SG currently maintaining the associated persistent connection (i.e., a current optimum SG), a newly-identified RE assuming responsibility for supporting an associated persistent connection (i.e., a new RE), and a newly-identified SG assuming responsibility for maintaining the persistent connection (i.e., a new optimum SG).

At step 206, the redirector element selects an optimum service gateway. In one embodiment, selection of the optimum SG is performed according to at least one factor, where the at least one factor comprises at least one of: at least one network parameter and at least one service parameter. In one embodiment, a RE receives a connection request and selects an optimum SG for supporting a persistent connection with the UD. In another embodiment, in which the received connection request comprises a service request for accessing at least one service, a RE selects an optimum SG in a manner tending to optimize a quality of service achieved while responding to the at least one service request.

For example, a network parameter comprises at least one of: a traffic load associated with each of the SGs, proximity of available SGs to the RE, a location associated with the service request source (e.g., UD), an AN identifier associated with the service request source, an AN technology type associated with the service request source, and like network parameters. For example, a service parameter comprises at least one of: a service type associated with a service request, functionality required for supporting a requested service, an associated capability of each of the available SGs to provide the required functionality, a QOS requirement associated with the requested service, and like service parameters.

At step 208, a determination is made as to whether authentication was previously performed. In one embodiment, the determination is made with respect to at least one of: UD authentication, user authentication, application authentication, service authentication, and the like. In other words, a determination is made as to whether a persistent connection associated with the UD exists in the network. If authentication was not previously performed (i.e., a persistent connection does not currently exist between the UD and a SG), method 200 proceeds to step 210. If authentication was previously performed (i.e., a persistent connection does currently exist between the UD and a SG), method 200 proceeds to step 220.

At step 210, the RE redirects the connection request to the optimum SG. In one embodiment, redirection of the connection request to the optimum SG comprises redirecting a PPP session established between the UD and RE towards the optimum SG. For example, upon determining that one of the UDs $106_1$ associated with the received connection request does not have a persistent connection with one of the SGs 110, RE $112_1$ redirects the PPP session established between the UD 106 and RE $112_1$ towards the optimum SG (e.g., SG $110_1$).

At step 212, the optimum SG obtains state information associated with the UD in response to the redirected service request. In one embodiment, the SG obtains multi-layer state information associated with the UD. For example, in one embodiment, the SG obtains at least one of: data-link layer state information, network layer state information, transport layer state information, and application layer state information. In one embodiment, the optimum SG uses the state information for establishing a persistent connection between the UD and the optimum SG. In another embodiment, the optimum SG uses the state information for maintaining the persistent connection established between the UD and the optimum SG through at least one network state change.

In one embodiment, a SG maintains a data-link layer state for at least a portion of the UDs serviced by that SG. For example, during initial connection establishment with ON 102, a UD establishes a PPP session with one of the SGs 110.

In one embodiment, a PPP session is state-full such that the SG maintains data-link layer state information associated with each PPP session with a mobile UD. In one embodiment, data-link layer state information comprises at least one of: a link state characteristic parameter, a compression protocol, a compression protocol state, a mobile user device IP address, and like information.

In another embodiment, a SG maintains a network layer state for at least a portion of the UDs serviced by that SG. For example, for mobile UDs utilizing Mobile IP at the network layer, a SG acts as a Foreign Agent (FA) for the mobile UDs by maintaining network layer state information. In one embodiment, network layer state information comprises at least one of: at least one FA to Home Agent (HA) tunneling state, at least one IPSec parameter, data-link layer reachability information associated with the mobile UD, and like information.

In another embodiment, a SG maintains a transport layer state for at least a portion of the UDs serviced by that SG. For example, in one embodiment, a SG maintains a persistent TCP session with a mobile UD (as a portion of the persistent connection) for reducing TCP startup delay associated with certain applications. In another embodiment, in which a mobile UD comprising an active session with one of the servers 120 becomes unreachable by the network (e.g., by an AN, by a RE, and the like), the SG supporting the session between the unreachable mobile UD and the server spoofs the mobile UD such that the session between the mobile UD and the server remains active until the mobile UD is once again reachable.

For example, upon detecting that the mobile UD is unreachable, the SG supporting the session between the unreachable mobile UD and the server may transmit TCP "keep-alive" messages to the server in order to prevent a TCP session timeout condition. Upon becoming reachable, the mobile UD resumes sending and receiving information with the server beginning at the point at which the mobile UD became unreachable. As such, by maintaining a persistent connection while the mobile UD is unreachable, the present invention obviates the need for the mobile UD to reestablish a connection with the server and to restart the information exchange upon becoming reachable.

In another embodiment, a SG maintains an application layer state for at least a portion of the UDs serviced by that SG. For example, in one embodiment, a SG monitors at least one application layer state for mimicking at least a portion of a mobile UD behavior in response to a determination that the mobile UD is temporarily unreachable by the SG. In other words, an optimum SG spoofs the mobile UD such that the application session between the mobile UD and the server remains active until the mobile UD is once again reachable.

At step 214, the optimum SG performs authentication. In one embodiment, the optimum SG performs device authentication (e.g., authenticating the UD to verify that the UD is permitted to access the network and associated network services). In another embodiment, the optimum SG performs user authentication (e.g., authenticating the user attempting to access the network via the authenticated UD). In another embodiment, the optimum SG performs application authentication (e.g., authenticating an application used for accessing network services). In another embodiment, the optimum SG performs service authentication (e.g., authenticating at least one service request initiated by the user via the authenticated application).

At step 216, the optimum SG establishes a connection with the UD. In one embodiment, a connection comprises a persistent connection (i.e., a connection that remains active through at least one network state change). In one embodiment, a persistent connection comprises at least one session. For example, the at least one session comprises at least one of: at least one data-link layer session, at least one network layer session, at least one transport layer session, at least one application layer session, and like sessions for establishing and maintaining persistent connections. As such, a persistent connection comprises a connection maintained in the network irrespective of UD status, SG status, and the like. The method 200 then proceeds to step 218, at which point the optimum SG maintains the state information obtained in step 212.

For example, in one embodiment, at least a portion of the state information is maintained by an optimum SG irrespective of whether the UD is reachable by the network. For example, if a mobile UD loses its physical connection with the AN serving that UD (e.g., the mobile UD enters a tunnel, the mobile UD loses its wireless signal due to fading, and the like), the SG with which the mobile UD previously established a connection maintains at least a portion of the state information associated with that mobile. For example, in another embodiment, at least a portion of the state information is maintained by the optimum SG irrespective of the movement from the UD within an AN, between ANs, across administrative boundaries, and the like.

At step 220, the current optimum SG maintaining the state information associated with the persistent connection is identified. In one embodiment, in which connection information is actively exchanged between SGs in the ON, the current optimum SG is identified by querying at least one connection table. In one embodiment, a connection table is stored in a storage component (e.g., a memory, database, and like storage components) on the RE that received the connection request. In another embodiment, a connection table is stored on at least one other system in communication with the RE. In one embodiment, the current optimum SG is identified by querying each of the SGs in the ON.

In one embodiment, the local table queries and network queries are performed using at least one of: a UD identifier associated with the UD, a connection identifier associated with the existing persistent connection, and like identifiers for identifying the existence of a connection between a particular UD and a SG. In one embodiment, identification of the current optimum SG supporting the persistent connection is performed as a portion of the processing performed in step 208.

At step 222, a determination is made as to whether the current SG identified in step 220 and the optimum SG selected in step 206 are the same. If the current SG and the optimum SG are the same, method 200 proceeds to step 218, at which point the optimum SG maintains the state information obtained in step 212, as described hereinabove. If the current SG and the optimum SG are not the same (i.e., the optimum SG selected in step 206 comprises a new optimum SG), method 200 proceeds to step 224. At step 224, the current SG transfers the state information from the current SG to the optimum SG in a manner that obviates the need for re-performing at least a portion of the authentication actions described herein.

In one embodiment, the state information is transmitted by the current optimum SG to the new optimum SG. In another embodiment, the RE that detects the mobile UD signals the current optimum SG, providing an indication to the current optimum SG to transfer the mobile UD state information to the new optimum SG selected by the RE. In another embodiment, the state information is retrieved by the new optimum SG from the current optimum SG. In another embodiment, the RE that detects the mobile UD signals the new optimum SG to which the persistent connection state information is migrated in order to provide an indication to the new optimum SG to retrieve the state information associated with that persistent connection from the current optimum SG.

In one embodiment, a connection request comprises a state information migration request for migrating the state information associated with a particular persistent connection. As such, in one embodiment, transfer of state information is initiated in response to a state information migration request initiated by at least one of: a current RE, a current optimum SG, a new RE, a new optimum SG, at least one other network component associated with the ON, and the like. The method 200 then proceeds to step 218, at which point the optimum SG maintains the state information as described herein.

As described herein, upon completion of steps 216 and 224, the method 200 proceeds to step 218, at which point the method 200 continues to maintain the state information associated with the persistent connection. The method 200 then proceeds to step 226. At step 226, a determination is made as to whether a new connection request is detected. If a new connection request is not detected, method 200 returns to step 218, at which point the method 200 continues to maintain the state information associated with the persistent connection. If a new connection request is detected, method 200 proceeds to step 228.

At step 228, a determination is made as to whether the new connection request is associated with the same RE. If the new connection request is not associated with the same RE, method 200 returns to step 204. If the new connection request is associated with the same RE, method 200 proceeds to step 230. At step 230, a new optimum SG is identified. At step 232, the persistent connection (comprising state information) is migrated from the current optimum SG to the new optimum SG using at least one of the methods described herein. The method 200 then returns to step 218, at which point method 200 continues to maintain the state information associated with the persistent connection.

As described herein, UD state information is created in a SG at the time the UD is powered up. Since network conditions are continuously changing, the current optimum SG with which the mobile UD initially established the persistent connection may not remain the SG most capable of maintaining the persistent connection. Similarly, since mobile UDs often roam, the current optimum SG with which the mobile UD initially established the persistent connection may not remain the SG most capable of maintaining the persistent connection.

In one embodiment, in which the new connection request is not associated with the current RE, the new connection request is detected by the new RE. In one such embodiment, the new connection request is detected in response to at least one of: a UD status change from inactive to active, movement of a UD within an AN, movement of a UD between ANs, movement of a UD across administrative boundaries, and like conditions resulting in a UD accessing the ON via a RE other than the current RE supporting the existing persistent connection.

In one embodiment, in which the new connection request is associated with the same RE, a new connection request is initiated in response to a determination that another SG (i.e., a SG other than the current optimum SG maintaining a particular persistent connection) is better-qualified for maintaining the persistent connection. In one such embodiment, the new connection request is initiated by at least one of: the current RE, a new RE, the current optimum SG, a new optimum SG, and the like. In another embodiment, in which the new connection request is associated with the same RE, a new connection request is initiated in response to a UD changing status from inactive to active.

For example, assume one of the UDs $106_1$ travels from a region served by AN $104_1$ (in which the mobile UD is served by RE $112_1$ and SG $110_2$) to a region served by AN $104_2$. Upon detecting the mobile UD, the RE $112_2$ determines an optimum SG for supporting that mobile UD. In one embodiment, upon determining that the optimum SG is SG $110_2$, RE $112_2$ determines whether the mobile UD currently has an existing connection with one of the SGs 110 in ON 102. In this example, RE $112_2$ determines that the mobile UD has an existing session with SG $110_2$ and signals SG $110_2$ providing an indication to SG $110_2$ to continue to maintain the state information associated with that mobile UD.

In another example, upon determining that the optimum SG is SG $110_3$, RE $112_2$ determines whether the mobile UD currently has an existing session with a SG in ON 102. In this example, RE $112_2$ determines that the mobile UD has an existing session with SG $110_2$. In one embodiment, RE $112_2$ signals SG $110_2$ to transmit the persistent connection state information to SG $110_3$. In another embodiment, RE $112_2$ signals SG $110_3$ to request the mobile UD state information from SG $110_2$. Similarly, the signaling for initiating the migration of persistent connection state information may be initiated by at least one of: a RE, another network component associated with the ON, and the like.

As described herein, irrespective of the source of a new connection request and the condition responsible for triggering the new connection request, the migration of the persistent connection (comprising associated state information operable for maintaining the persistent connection) is accomplished using at least one of a plurality of methods. As such, connection request initiation/detection and persistent connection migration initiation is performed by at least one of: a UD, a current RE supporting the persistent connection, a new RE operable for supporting the persistent connection, a current optimum SG, a new optimum SG operable for maintaining the persistent connection, and various other network components associated with the ON.

As depicted in FIG. 2, the present invention enables significant reductions in service request response times by eliminating numerous time-intensive actions required in order to respond to UD status changes and various service requests. For example, following the initial authentication required in order to establish a persistent connection between a UD and a SG, the present invention enables the connection to be maintained by the network in a manner tending to eliminate the need for re-performing steps 210, 212, 214, and 216 in response to each UD status change (e.g., a dropped connection, a handoff from one AN to another AN, and the like). Similarly, following the initial authentication required for establishing a persistent connection between a UD and a SG, the present invention enables the connection to be maintained by the network in a manner tending to eliminate the need for re-performing methodology depicted and described with respect to FIG. 2 in response to each service request.

Figure 3:
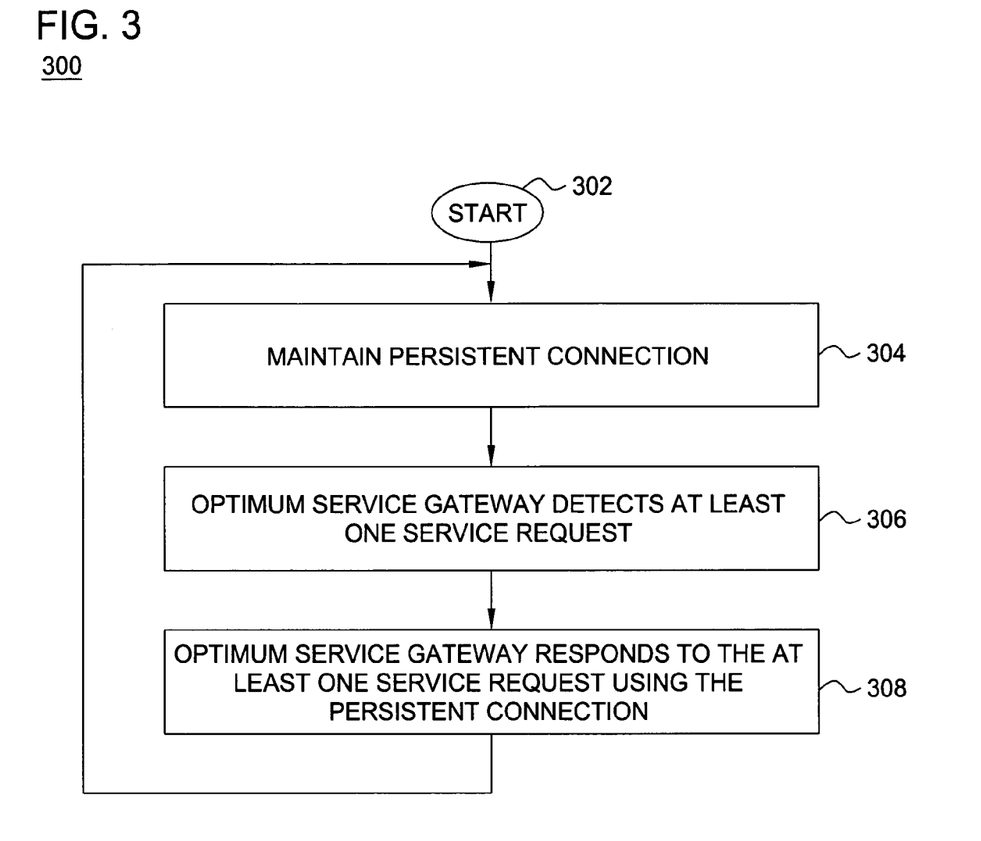
FIG. 3 depicts a flow diagram of a method according to one embodiment of the invention.

FIG. 3 depicts a flow diagram of a method according to one embodiment of the invention. Specifically, method 300 of FIG. 3 comprises a method for responding to at least one service request using a persistent connection established between a user device and a service gateway. Although depicted as being performed serially, those skilled in the art will appreciate that at least a portion of the steps of method 300 may be performed contemporaneously. The method 300 is entered at step 302 and proceeds to step 304. At step 304, a persistent connection is maintained. An exemplary method for maintaining a persistent connection between a UD and a SG comprises method 200 depicted and described with respect FIG. 2.

At step 306, an optimum service gateway detects at least one service request. As described herein, a service request comprises at least one of: a request to retrieve information from the Internet, a request to chat with at least one other user via instant messaging, a request to view a catalogue online, a request to purchase an item online, a request to access an "always-on" service, and like service requests capable of being initiated via a user device. At step 308, the optimum service gateway responds to the at least one service request using the persistent connection. The method 300 then returns to step 304.

In one embodiment, the at least one service request is received from the UD with which the persistent connection is maintained. In one embodiment, a service request received from the UD with which the persistent connection is maintained comprises a request to view information. In one embodiment, the optimum SG retrieves at least one service record from at least one server, and transmits the at least one service record towards the UD using the associated persistent connection. In one embodiment, a service request received from the UD with which the persistent connection is maintained comprises a request to communicate with at least one other UD. In one embodiment, the optimum SG facilitates communication between the UD and the at least one other UD using the persistent connection.

In another embodiment, the at least one service request is received from a server (illustratively, one of the servers 120). In one embodiment, the optimum SG retrieves at least one service record in response to receiving a service request from a server. In another embodiment, the service request received by the optimum SG comprises at least one service record. In one embodiment, the optimum SG transmits the at least one service record towards the UD using the associated persistent connection. In such embodiments, the service request initiated by a server essentially comprises a "service push" for automatically providing information (e.g., periodic weather updates, location based traffic updates, and the like) to the UD.

In another embodiment, the at least one service request is detected by the optimum SG. In one embodiment, the optimum SG obtains at least one service parameter, and transmits the at least one service parameter towards the UD using the associated persistent connection. In one embodiment, the at least one service parameter comprises at least one of: at least one context parameter for providing context notification to a UD, at least one paging parameter for paging a UD, and like service parameters. As described herein, a context parameter is used by a UD to reconfigure itself, and a paging parameter is used by a UD for notifying the optimum SG of its location.

In another embodiment, the at least one service request is received from at least one of: at least one other UD, at least one other SG, at least one other RE, and like components associated with the ON. In this embodiment, the at least one service request comprises at least one of: a request to join an existing chat session, a request to communicate with the UD with which the persistent connection was initially established, and like requests requiring communication with the optimum SG with which the original persistent connection was established. The embodiment in which a service request is received from at least one other UD is depicted and described with respect to method 400 of FIG. 4.

Figure 4:
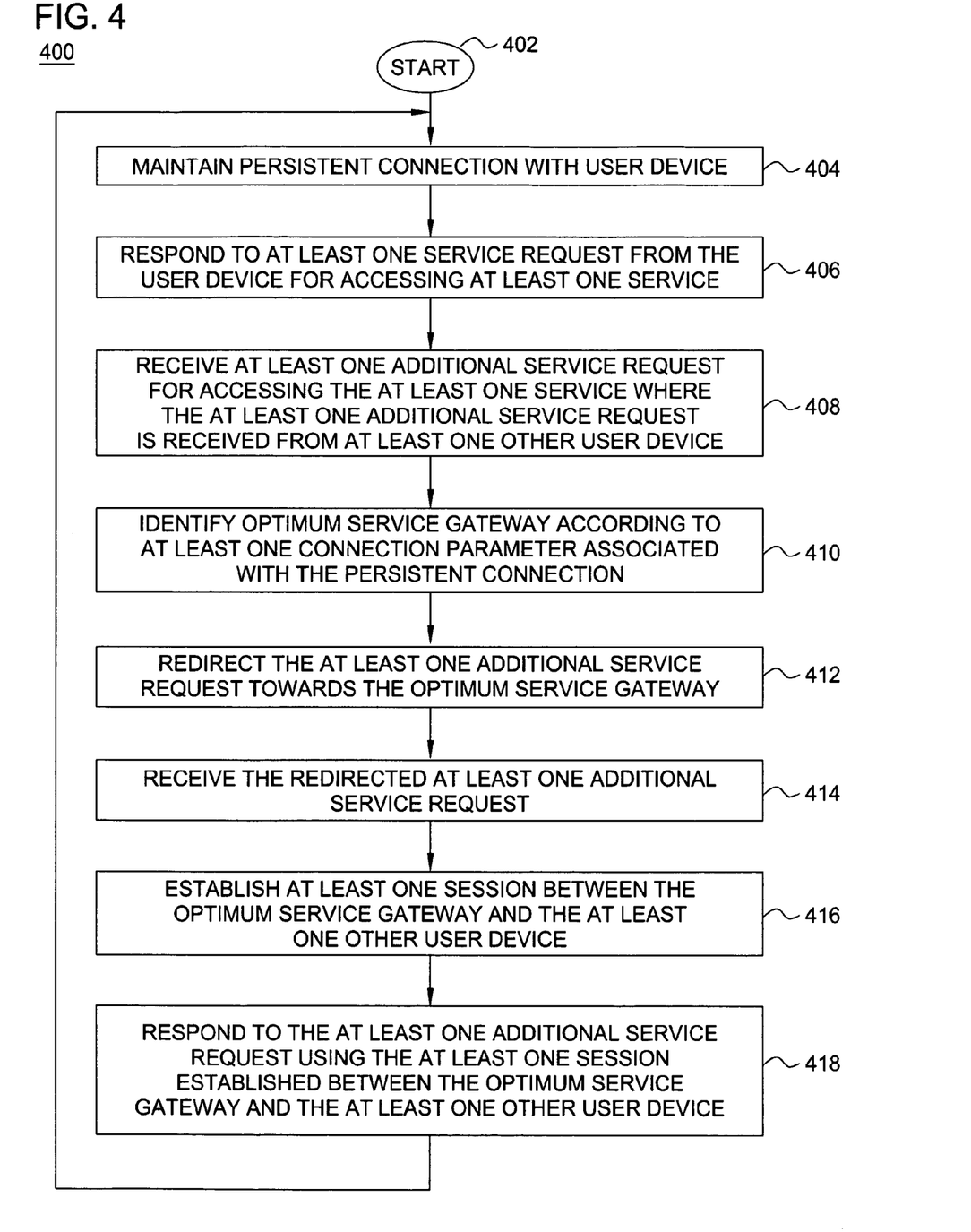
FIG. 4 depicts a flow diagram of a method according to one embodiment of the invention.

FIG. 4 depicts a flow diagram of a method according to one embodiment of the invention. Specifically, method 400 of FIG. 4 comprises a method for responding to at least one service request received from at least one other UD. Although depicted as being performed serially, those skilled in the art will appreciate that at least a portion of the steps of method 400 may be performed contemporaneously. The method 400 is entered at step 402 and proceeds to step 404.

At step 404, a persistent connection is maintained. An exemplary method for maintaining a persistent connection between a UD and a SG comprises method 200, depicted and described with respect FIG. 2. At step 406, at least one service request received from the UD is responded to for accessing at least one service. An exemplary method for responding to at least one service request comprises method 300, depicted and described with respect FIG. 3. At step 408, at least one additional service request for accessing the at least one service is received from at least one other UD (i.e., a UD other than the UD with which the persistent connection is established). For example, an additional service request may comprise a request by another UD to access an existing instant messaging chat session.

At step 410, the optimum SG is identified using at least one parameter. In one embodiment, the at least one parameter comprises at least one of: at least one connection parameter associated with the persistent connection, at least one service parameter associated with a service request, and the like. In one embodiment, the at least one connection parameter comprises at least one of: at least one connection identifier at least one optimum SG identifier, at least one session identifier (e.g., a TCP session identifier), and the like.

At step 412, the at least one additional service request is redirected towards the optimum SG. In one embodiment, an additional service request is redirected by a RE. In another embodiment, an additional service request is redirected by another optimum SG associated with one of the at least one other UDs. At step 414, the redirected at least one additional service request is received. In one embodiment, the redirected at least one additional service request is received by the optimum SG. At step 416, at least one session is established between the optimum SG and the at least one other UD from which the at least one additional service request is received.

At step 418, the at least one additional service request is responded to using the at least one session established between the optimum SG and the at least one other UD. In one embodiment, the at least one session comprises a Multi-Protocol Label Switching (MPLS) tunnel established between the optimum SG associated with the original UD and an optimum SG associated with the other UD from which the at least one additional service request is received. The method 400 then returns to step 404.

In one embodiment, establishing and continuously maintaining persistent connections with an ON enables UDs to access service applications and associated "always-on" services using the methodologies of the present invention. In one embodiment, "always-on" services comprise at least one of: a push-to-connect service, a network-pushed service, and like services. In one embodiment, a push-to-connect service comprises at least one of: a push-to-talk service, a push-to-conference service, a push-to-connect service, a push-to-view service, a push-to-game service, and the like.

As such always-on services enable users, by pressing a button, to view information from the Internet, view information from other users, play games with other users, exchange data with other users, establish a text-based chat conference with a plurality of users, establish a voice-based conference with a plurality of users, establish connections with other users, receive information pushed by a network, talk to other users, and the like.

As such, each of the always-on services enables retrieval of information, receipt of information, and communication between a plurality of users while obviating the need to establish a connection with a particular network or a particular user (e.g., by dialing a telephone number). In other words, since the network remains aware of the presence of users (and retains each user's state information), "always-on" services enable users to remain connected to the network without having to explicitly dial the network in order to establish a connection with the network.

In one embodiment, using the methodologies of the present invention, in support of network services (including always-on services), a UD activates (i.e., wakes) an application from dormant mode, connects to at least one service using the application, and accesses the at least one service (e.g., uses at least one available "always-on" service). As such, the methodologies of the present invention obviates the need for a UD to perform functions such as booting an operating system, establishing a connection, authenticating a user, starting an application, authenticating an application, and like functions.

In one embodiment, using the methodologies of the present invention, an AN selects and acquires a channel and maintains persistent sessions between UDs and an associated ON. As such, the methodologies of the present invention obviate the need for an AN to perform functions such as UD authentication, UD registration, establishing link-level connections, authenticating IP addresses, and like functionality. In one embodiment, using the methodologies of the present invention, a network server maintains persistent sessions with UDs and responds to service requests from the UDs. As such, the methodologies of the present invention obviate the need for a network server to perform functions such as UD authentication, connection establishment, and like functions.

In one embodiment, the present invention enables a service provider to maintain state information for dormant UDs, enabling dormant UDs to maintain connections with a services network (illustratively, ON 102). Furthermore, the present invention enables ON 102 to transfer state information between network elements (illustratively, between SGs 110) in response to network state changes. As such, by enabling the ON to maintain connections with UDs regardless of UD state changes (i.e., changed between active and dormant, geographic location changes, and the like) the present invention minimizes potential for broken network connections. Furthermore, the present invention provides enhanced QOS for the persistent network connections.

For example, using the methodologies of the present invention, an ON may provide "always-on" services to users of a particular service provider (e.g., Verizon Wireless subscribers) across disparate link layer technologies (e.g., 3G, 4G, WIFI, and the like). Similarly, for example, using the methodologies of the present invention, an ON may provide "always-on" services to users of different service providers (e.g., enabling PTT between a Verizon Wireless subscriber and a Nextel subscriber) across disparate link layer technologies (e.g., 3G, 4G, WIFI, and the like).

It is contemplated that at least a portion of the described functions may be combined into fewer functional elements/devices. Similarly, it is contemplated by the inventors that various functions may be performed by other functional elements, or that the various functions may be distributed across the various functional elements in a different manner. For example, at least a portion of the functions performed by the REs 112 may be performed by the SGs 110 and the ANs 104. Similarly, at least a portion of the functions performed by the SGs 110 may be performed by the REs 112 and the ANs 104.

Figure 5:
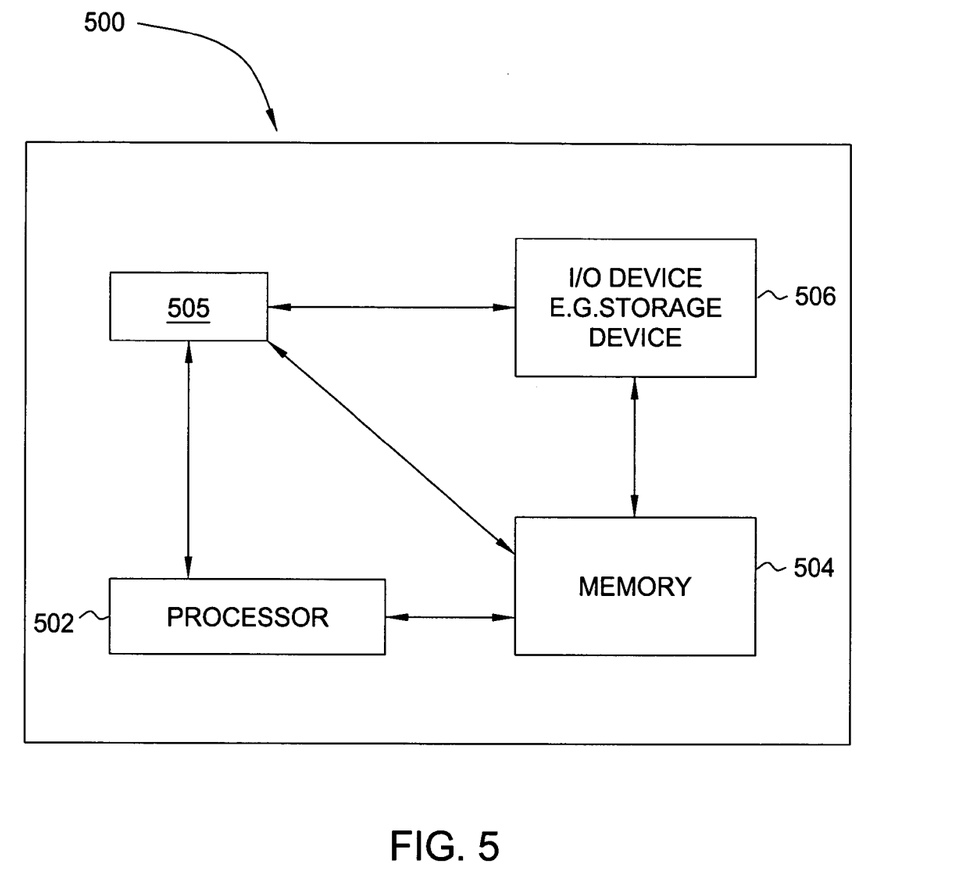
FIG. 5 depicts a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a persistent connection module 505, and various input/output devices 506 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present persistent connection module or process 505 can be loaded into memory 504 and executed by processor 502 to implement the functions as discussed above. As such, the present persistent connection process 505 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method for providing services to a user device using a service overlay network comprising a plurality of service gateways, the method comprising:

receiving, at a first service gateway of said service overlay network, a request to support a persistent connection between said user device and said service overlay network, said persistent connection having state information associated therewith, wherein said request to support said persistent connection is associated with a first redirector element configured for selecting said first service gateway to support said persistent connection for said user device;

maintaining said state information associated with said persistent connection at said first service gateway;

receiving, at said first service gateway, a request to migrate said state information of said persistent connection from said first service gateway to a second service gateway of said service overlay network, wherein said request to migrate said state information of the persistent connection is associated with a second redirector element configured for selecting said second service gateway to support said persistent connection for said user device; and propagating said state information from said first service gateway toward said second service gateway.

2. The method of claim 1, wherein:

said service overlay network is accessible to said user device via multiple access networks having one or more of different access technologies and different service providers associated therewith;

said first redirector element is associated with a first access network having a first access technology and a first service provider associated therewith, and said second redirector element is associated with a second access network having at least one of a second access technology and a second service provider associated therewith.

3. The method of claim 2, wherein said first and second access networks are associated respectively with different technologies and different service providers.

4. The method of claim 1, wherein said state information comprises:
- at least one data-link layer state parameter;
- at least one network layer state parameter;
- at least one transport layer state parameter; and
- at least one application layer state parameter.

5. The method of claim 1, further comprising:
- receiving, at said first service gateway, a service request for a service supported by said first service gateway; and
- responding to said at least one service request using said persistent connection.

6. The method of claim 1, further comprising:
- receiving, at said first service gateway, a service request for a service supported by a server accessible to said user device via the service overlay network; and
- propagating, from said first service gateway, the service request toward said server.

7. The method of claim 6, further comprising:
- receiving, at said first service gateway, a service response of said server that is intended for said user device;
- storing, at said first service gateway, at least a portion of said service response in response to a determination that said user device is unavailable; and
- transmitting said at least a portion of said service response toward said user device in response to a determination that said user device is available.

8. The method of claim 1, further comprising:
- receiving, at said first service gateway, a message from said user device; and
- transmitting said message from said first service gateway toward at least one other user device.

9. The method of claim 1, wherein said user device is a first user device, said method further comprising:
- receiving, at said first service gateway from said second redirector element, a first service request initiated by said first user device for accessing a service; and
- receiving, at said first service gateway from a third redirector element, a second service request initiated by a second user device for accessing said service.

10. The method of claim 1, wherein said user device is a first user device, said method further comprising:
- receiving, at said first service gateway from said second redirector element, a first service request initiated by said first user device for accessing a service; and
- receiving, at said first service gateway from a third service gateway, a second service request initiated by a second user device for accessing said service, wherein said third service gateway is configured for maintaining a persistent connection for said second user device.

11. The method of claim 1, further comprising:
- in response to receiving said request to support the persistent connection, authenticating said user device at said first service gateway;
- wherein migration of said state information from said first service gateway to said second service gateway obviates a need for authentication of said user device by said second service gateway.

12. The method of claim 1, further comprising:
- initiating, by said first service gateway, paging of said user device for determining whether said user device is dormant.

13. The method of claim 1, further comprising:
- preparing context information associated with said user device, wherein said context information is prepared by said first service gateway dynamically; and
- performing at least one of:
  - transmitting at least a portion of said context information toward said user device for use by said user device to configure itself; and
  - transmitting at least a portion of said context information toward a server for use by said server in providing service to said user device.

14. The method of claim 1, wherein said state information associated with said persistent connection is maintained at said first service gateway such that said persistent connection is persistent through one or more of:
- state changes associated with said user device and
- state changes associated with said first service gateway.

15. A non-transitory computer readable storage medium storing a software program, that, when executed by a computer, causes the computer to perform steps for providing services to a user device using a service overlay network comprising a plurality of service gateways, the steps comprising:
- receiving, at a first service gateway of said service overlay network, a request to support a persistent connection between said user device and said service overlay network, said persistent connection having state information associated therewith, wherein said request to support said persistent connection is associated with a first redirector element configured for selecting said first service gateway to support said persistent connection for said user device;
- maintaining said state information associated with said persistent connection at said first service gateway;
- receiving, at said first service gateway, a request to migrate said state information of said persistent connection from said first service gateway to a second service gateway of said service overlay network, wherein said request to migrate said state information of the persistent connection is associated with a second redirector element configured for selecting said second service gateway to support said persistent connection for said user device; and
- propagating said state information from said first service gateway toward said second service gateway.

16. The non-transitory computer readable storage medium of claim 15, wherein:
- said service overlay network is accessible to said user device via multiple access networks having one or more of different access technologies and different service providers associated therewith;
- said first redirector element is associated with a first access network having a first access technology and a first service provider associated therewith, and said second redirector element is associated with a second access network having at least one of a second access technology and a second service provider associated therewith.

17. The non-transitory computer readable storage medium of claim 15, further comprising:
- receiving, at said second service gateway, a service request for a service supported by said second service gateway; and
- responding to said at least one service request using said persistent connection.

18. The non-transitory computer readable storage medium of claim 17, wherein said user device is a first user device, the method further comprising:
- receiving, at said first service gateway from said second redirector element, a first service request initiated by said first user device for accessing a service; and
- receiving, at said first service gateway from a third service gateway, a second service request initiated by a second user device for accessing said service, wherein said third service gateway is configured for maintaining a persistent connection for said second user device.

19. The non-transitory computer readable storage medium of claim 18, further comprising:

preparing context information associated with said user device, wherein said context information is prepared by said first service gateway dynamically; and performing at least one of:

transmitting at least a portion of said context information toward said user device for use by said user device to configure itself; and transmitting at least a portion of said context information toward a server for use by said server in providing service to said user device.

20. An apparatus for providing services to a user device using a service overlay network comprising a plurality of service gateways, comprising:

a processor configured to:

receive, at a first service gateway of said service overlay network, a request to support a persistent connection between said user device and said service overlay network, said persistent connection having state information associated therewith, wherein said request to support said persistent connection is associated with a first redirector element configured for selecting said first service gateway to support said persistent connection for said user device;

maintain said state information associated with said persistent connection at said first service gateway;

receive, at said first service gateway, a request to migrate said state information of said persistent connection from said first service gateway to a second service gateway of said service overlay network, wherein said request to migrate said state information of the persistent connection is associated with a second redirector element configured for selecting said second service gateway to support said persistent connection for said user device; and propagate said state information from said first service gateway toward said second service gateway.

* * * * *